Nov. 28, 1967  B. O. BECK  3,354,559
BALLISTIC PENDULUM
Filed Aug. 19, 1965
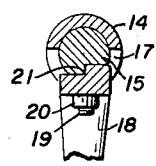
FIG. 8.
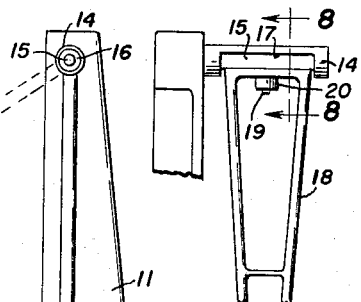
FIG. 2.
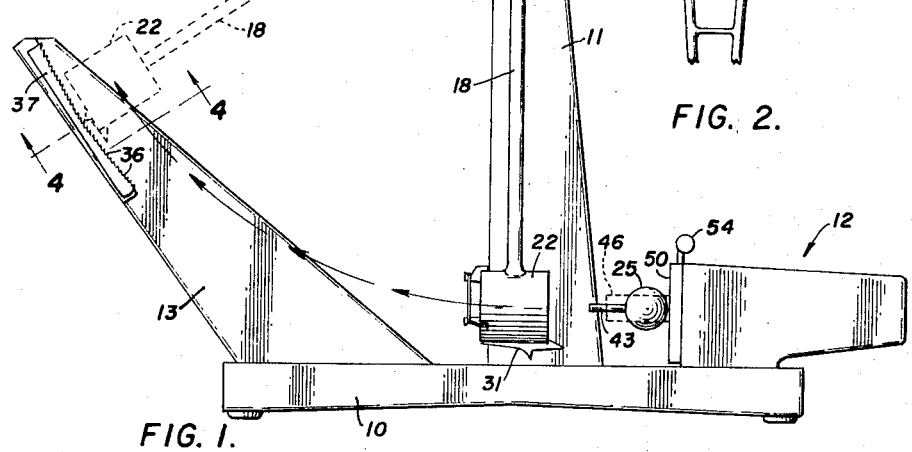
FIG. 1.
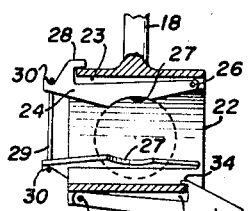
FIG. 3.
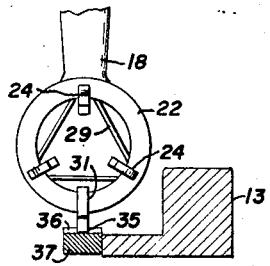
FIG. 4.
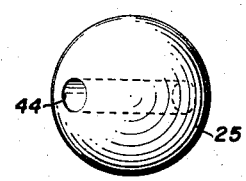
FIG. 7.
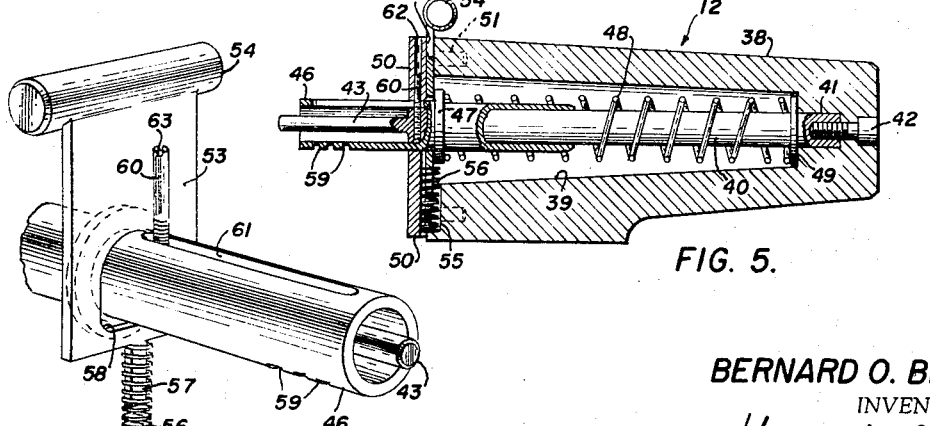
FIG. 5.
FIG. 6.
BERNARD O. BECK
INVENTOR.
BY
ATTORNEY United States Patent Office 3,354,559
Patented Nov. 28, 1967

3,354,559
BALLISTIC PENDULUM
Bernard O. Beck, P.O. Box 272, Arlington, Tex. 76010
Filed Aug. 19, 1965, Ser. No. 481,041
2 Claims. (Cl. 35—19)

ABSTRACT OF THE DISCLOSURE

A ballistic pendulum including a cylindrical bob, and open end of which faces a firing mechanism which propels a ball projectile, radially disposed plates within said cylindrical bob, said plates being pivotally mounted in said open end of said bob, arcs in the inner edges of said plates for receiving said ball projectile, and spring means urging said plates toward the axial center of said bob.

---

This invention relates to ballistic pendulums for demonstrating to students and others the principle of conservation of motion. Particularly, the invention is directed to improvements in ballistic pendulums such as illustrated and described in expired U.S. Patent No. 1,636,234 which issued July 19, 1927.

A first experiment is carried out by impact of a projectile of known mass in a pendulum bob of known mass, noting the resulting height of the bob and projectile after impact, and then determining the velocity of the projectile. A second experiment is then performed to check the velocity thus found, and which second experiment has to do with propelling the same projectile from the same gun and measuring time and distance without the use of the pendulum.

The primary object of the invention is to provide a ballistic pendulum having greater accuracy than the pendulum of the referred to expired patent.

A particular object of the invention is to provide an improved trap in the bob of the pendulum for accurately locating the ball projectile received therein.

Another object is to provide, in a ballistic pendulum, an improved and more accurate gun for propelling the ball projectile.

A further object is to provide locating means whereby the pendulum arm and bob will be correctly orientated when replacing the same on the suspending shaft after the arm and bob have been removed for weighing, a step in the experiment for calculating the velocity of the projectile.

A still further object is to provide a pendulum of the described class which is rugged and requires very little adjustment and maintenance.

These and other objects of the invention will become apparent from the following description and the accompanying drawing, in which:

FIGURE 1 is a side elevational view of a ballistic pendulum according to the present invention.

FIGURE 2 is a fragmentary end elevational view of the upper portion of FIGURE 1.

FIGURE 3 is a longitudinal sectional view of the pendulum bob and showing the ball projectile receiving and centering mechanism.

FIGURE 4 is a sectional view taken on lines 4—4 of FIGURE 1, and additionally showing the projectile receiving end of the bob in elevation relative to the rack on the rack mount.

FIGURE 5 is a longitudinal vertical sectional view of the spring actuated gun for propelling the projectile.

FIGURE 6 is an enlarged fragmentary perspective view of the forward operating parts of the gun.

FIGURE 7 is an enlarged perspective view of the ball projectile, and

FIGURE 8 is a sectional view taken on line 8—8 of FIGURE 2.

The ballistic pendulum shown includes an elongate base 10, a mast 11 on one side of the base between the ends thereof, a gun mechanism 12 on one end of the base and an upwardly and outwardly extending rack mount 13 on the other end. Projecting from the upper end of the mast 11, and at a right angle with reference to the length of the base 10, there is a tubular housing 14 wherein there is a shaft 15 which is mounted for free rotation by means of ball bearings 16 on its ends. The lower and side portions of the shaft housing 14 are cut away, at 17, to accommodate a triangular truss type pendulum arm 18. The upper end of the arm 18, which is the base end of an isosceles triangle, is detachably secured to the shaft 15 within the cutaway 17 by means of a threaded projection 19 on the shaft and a tubular nut 20 on the projection. As shown in FIGURE 8, the shaft 15 and the horizontal upper end of the arm 18 have interfitting grooves 21 which are step milled so that it would be unlikely that a student would put the arm on the shaft backwards. The pendulum arm 18 is preferably of aluminum or other lightweight but sturdy material. On the lower end of the arm 18 there is a cylindrical pendulum bob 22, the axis of which is parallel with the length of the base 10. As best shown in FIGURES 3 and 4, there are three longitudinal equally spaced radial grooves 23 in the inner wall of the bob 22, which grooves hingedly receive steel plates 24 for catching a ball projectile 25 propelled by the gun mechanism 12. Each plate 24 is pivotally mounted at its forward end by a transverse pin 26, and the inner edge of each plate intermediate its end is arcuate at 27 to receive the ball in line with the center of the pendulum arm 18. The rear ends of the plates 24 extend through the bob 22 where they have integral hooks 28 arranged to engage the outer surface of the bob when the extending ends of the plates are in their inwardly moved positions. The plates 24 are normally held in their inward or contracted positions by a rubber band 29 around projections 30 on the outer extending ends of the plates.

There is a forwardly directed pawl 31 in a longitudinal slot 32 in the bottom outside surface of the bob 22, and which pawl is pivotally mounted at its rear end by a pin 33. The forward end of the pawl 31 is tapered downwardly and outwardly and there is a hook 34 on the inner edge of said forward end for engaging the inner surface of the bob 22. Thus, by gravity, the pawl 31 normally assumes a down position.

There is a single depending tooth 35 on the bottom of the pawl 31 for engagement with teeth 36 on a rack 37 on the side of the rack mount 13. It is to be noted that the teeth 36 on the rack 37 lie within an arc generated about the center of the pendulum shaft 15.

The gun mechanism 12 includes a housing 38 which may be of cast aluminum. There is a horizontal cavity 39 in the housing, the forward end of which is open and directed toward the bob 22. Within and extending the length of the cavity 39 there is a support rod 40, one end of which is snugly received in a cylindrical recess 41, and a countersunk recessed head bolt 42 in the end of the housing 38 rigidly secures the support rod in place. The forward end of the support rod 40, which extends outwardly of the housing 38, is of reduced diameter to provide a guide rod 43 on which the ball projectile 25 is slidably mounted. There is a drilled hole 44 through the ball projectile 25 for this purpose. The projectile 25 bears against the forward end of the ram 46 when the gun mechanism 12 is in its cocked position.

Slidably mounted on the forward end of the support rod 40 there is a tubular ram 46 having a flange 47 therearound. There is a coiled compression spring 48 around the inner portion of the ram 46 and around the length of the support rod 40. The forward end of the spring 43 bears against the flange 47 and the rear end of the spring bears against a flange 49 around the support rod 40, which flange rests against the end of the cavity 39.

On the forward end of the housing 38 there is a face plate 50 which is held in place by screws 51. The back of the face plate 50 is channeled, at 52, to slidably receive a vertically movable trigger plate 53. An operating bar 54 of round stock is secured, as by welding, to the upper edge of the trigger plate 53 for pressing the latter downwardly against spring action to be described. A vertical recess 55 is provided in the lower rear surface of the face plate 50 and the lower front surface of the housing 38 for receiving a coiled spring 56. That portion of the recess 55 in the housing 38 is closed at its lower end for supporting the spring as shown in FIGURE 5. A depending finger 57 on the bottom of the trigger plate 53 extends into the spring 56 to assure alignment of the latter.

There is an opening 58 in the trigger plate 53 through which the forward end of the ram 46 projects, and the bottom of the opening is straight for engaging spaced notches 59 in the forward lower portion of the ram 46. The ram 46 is prevented from rotating about its axis by means of a vertical pin 60 which is threadedly engaged in the support rod 40. The pin 60 extends upwardly through a longitudinal slot 61 in the upper forward portion of the ram 46 and into a vertical drilled opening 62 in the face plate 50. The opening 62 provides access to a slot 63 in the top of the pin 60 for screwing and unscrewing the same, and provides additional stability to the forward end of the rod 40.

The experiments performed with a ballistic pendulum are well known to the art and are not, therefore, repeated here. However, the operations of the gun mechanism 12, the bob 22 and the pawl 31 with the rack 37 are new and novel. The support rod 40 accurately and consistently directs the projectile 25 on the guide rod 43 toward the opend end of the bob 22. To cock the firing mechanism 12 the ram 46 is pressed inwardly until the straight edge of the opening 58 in the trigger plate 53 engages the first notch 59 in the ram. If greater spring force is desired for increased velocity of the projectile 25, then the trigger plate 53 is pressed downwardly and the ram 46 is pushed farther into the housing 38 until the desired notch 59 is engaged. The mechanism is fired by lightly pressing the operator bar 54.

The plate construction 24 assures accurate location of the ball projectile 25 within the center of the bob 22 at all times by reason of the radial arrangement of the plates 24 and the arcs 27 in their inner edges. It is pointed out that the rubber band may be conveniently replaced.

The pawl 31 is not spring loaded; thus, there is a minimum of friction when the tooth 35 contacts the teeth 36 of the rack 37.

The invention is not limited to the exemplary construction herein shown and described, but may be made in various ways within the scope of the appended claims.

What is claimed is:

1. In a ballistic pendulum including a cylindrical bob, an open end of which faces a firing mechanism which propels a ball projectile, radially disposed plates within said cylindrical bob, said plates being pivotally mounted in said open end of said bob, arcs in the inner edges of said plates for receiving said ball projectile, and spring means urging said plates toward the axial center of said bob.

2. In a ballistic pendulum, the construction defined in claim 1 and wherein said means urging said plates toward the axial center of said bob includes a rubber band around said plates at the ends thereof opposite their pivots.

References Cited

UNITED STATES PATENTS 1,636,234    7/1927    Klopsteg    35—19
3,061,311   10/1962   Von Arnhem   273—96

EUGENE R. CAPOZIO, *Primary Examiner.*

H. S. SKOGQUIST, *Assistant Examiner.*